US008240144B2

(12) United States Patent
Vigholm et al.

(10) Patent No.: US 8,240,144 B2
(45) Date of Patent: Aug. 14, 2012

(54) METHOD FOR CONTROLLING A HYDRAULIC MACHINE IN A CONTROL SYSTEM

(75) Inventors: Bo Vigholm, Stora Sundby (SE); Markku Palo, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 911 days.

(21) Appl. No.: 12/097,922

(22) PCT Filed: Jan. 16, 2007

(86) PCT No.: PCT/SE2007/000032
§ 371 (c)(1), (2), (4) Date: Jun. 18, 2008

(87) PCT Pub. No.: WO2007/081277
PCT Pub. Date: Jul. 19, 2007

(65) Prior Publication Data

US 2008/0292474 A1 Nov. 27, 2008

Related U.S. Application Data

(60) Provisional application No. 60/759,996, filed on Jan. 18, 2006.

(30) Foreign Application Priority Data

Jan. 16, 2006 (SE) ........................................ 0600087

(51) Int. Cl.
*F16D 31/02* (2006.01)

(52) U.S. Cl. ........................................ 60/431

(58) Field of Classification Search .................... 60/327, 60/431
See application file for complete search history.

(56) References Cited

U.S. PATENT DOCUMENTS

| | | | | |
|---|---|---|---|---|
| 4,118,149 | A * | 10/1978 | Hagberg | 60/431 |
| 4,712,376 | A | 12/1987 | Hadank et al. | |
| 5,649,422 | A * | 7/1997 | Baginski et al. | 60/431 |
| 5,916,138 | A * | 6/1999 | Hild et al. | 60/327 |
| 6,260,356 | B1 * | 7/2001 | Baughn et al. | 60/431 |

FOREIGN PATENT DOCUMENTS

| | | | |
|---|---|---|---|
| EP | 0034900 | A1 | 9/1981 |
| EP | 1505717 | A1 | 2/2005 |

* cited by examiner

*Primary Examiner* — Daniel Lopez
(74) *Attorney, Agent, or Firm* — WRB-IP LLP

(57) ABSTRACT

A method is provided for controlling a hydraulic machine in a control system when utilizing the hydraulic machine as a pump, in which an electric machine is connected in a driving manner to the hydraulic machine. The method includes detecting at least one operating parameter, determining, based on the detected operating parameter, whether a pressure supplied by the hydraulic machine is to be limited, and controlling the electric machine correspondingly.

11 Claims, 3 Drawing Sheets

METHOD FOR CONTROLLING A HYDRAULIC MACHINE IN A CONTROL SYSTEM

BACKGROUND AND SUMMARY

The present invention relates to a method for controlling a hydraulic machine in a control system when utilizing the hydraulic machine as a pump, in which an electric machine is connected in a driving manner to the hydraulic machine. In particular, the invention relates to a method for limiting the pump pressure in a hydraulic system for a work machine.

The invention will be described below in connection with a work machine in the form of a wheel loader. This is a preferred but in no way limiting application of the invention. The invention can also be used for other types of work machines (or work vehicles), such as an excavator loader (backhoe) and excavating machine.

The invention will be described below in a control system which comprises a hydraulic machine which functions as both pump and motor. The hydraulic machine is connected in a driving manner to an electric machine which functions as both motor and generator. This type of control system is only to be regarded as an example and does not restrict the scope of the invention.

The hydraulic machine therefore functions as a pump in a first operating state and supplies pressurized hydraulic fluid to the hydraulic cylinder. The hydraulic machine also functions as a hydraulic motor in a second operating state and is driven by a hydraulic fluid flow from the hydraulic cylinder. The electric machine therefore functions as an electric motor in the first operating state and as a generator in the second operating state.

The first operating state corresponds to a work operation, such as lifting or tilting, being carried out with the hydraulic cylinder. Hydraulic fluid is therefore directed to the hydraulic cylinder for movement of the piston of the cylinder. On the other hand, the second operating state is an energy recovery state.

According to a previously known pump, there is a regulator in the pump that provides a pressure-limiting function so that the displacement of the pump is reduced in the event of too high a pressure.

A first object of the invention is to provide a control method that provides effective protection for the pump during operation.

According to an aspect of the present invention, a method is provided for controlling a hydraulic machine in a control system when utilizing the hydraulic machine as a pump, in which an electric machine is connected in a driving manner to the hydraulic machine, comprising the steps of detecting at least one operating parameter, of determining, on the basis of the detected operating parameter, whether a pressure supplied by the hydraulic machine is to be limited, and of controlling the electric machine correspondingly.

By this means, a pressure-limiting function is obtained. It is therefore possible to eliminate the pressure-limiting function incorporated in a conventional pump and thus to use a simpler/cheaper pump as the hydraulic machine.

According to a preferred embodiment, the method comprises the steps of determining a torque out from the electric machine on the basis of a torque in to the electric machine and the displacement of the hydraulic machine, and of controlling the electric machine correspondingly. The electric machine is also preferably controlled in a way that corresponds to the efficiency of the hydraulic machine. The torque out from the electric machine is suitably calculated on the basis of said input data.

According to a preferred example of the abovementioned method, the torque into the electric machine is detected. According to another example, various predetermined values of the torque in to the electric machine are utilized, preferably dependent upon the current work function.

Further preferred embodiments and advantages of the invention emerge from the following description.

BRIEF DESCRIPTION OF THE DRAWINGS

The invention will be described in greater detail below with reference to the embodiments shown in the accompanying drawings, in which.

DETAILED DESCRIPTION

Figure 1:
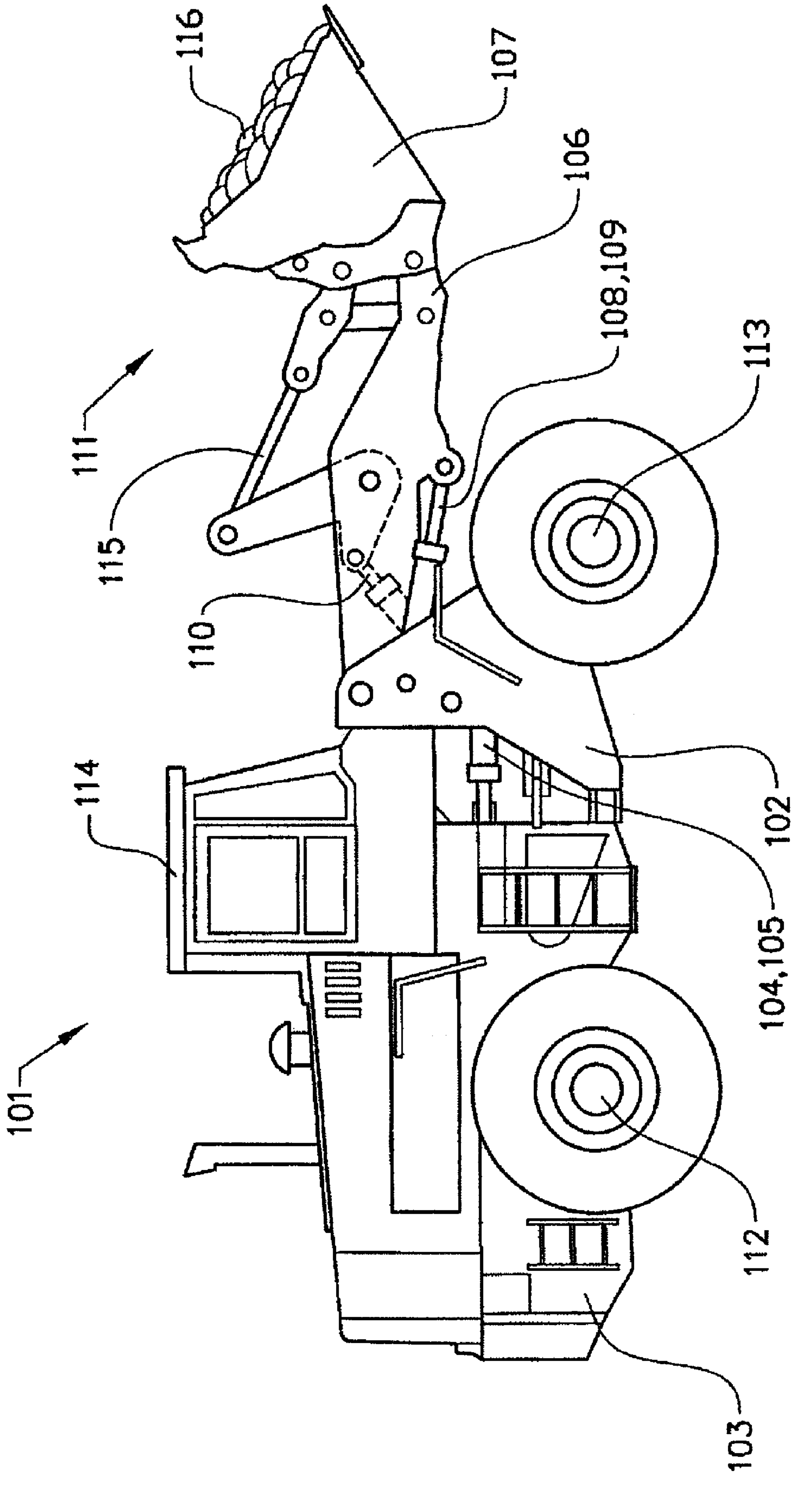
FIG. 1 shows a side view of a wheel loader.

FIG. 1 shows a side view of a wheel loader 101. The wheel loader 101 comprises a front vehicle part 102 and a rear vehicle part 103, which parts each comprise a frame and a pair of drive axles 112, 113. The rear vehicle part 103 comprises a cab 114. The vehicle parts 102, 103 are coupled together with one another in such a way that they can be pivoted in relation to one another about a vertical axis by means of two hydraulic cylinders 104, 105 which are connected to the two parts. The hydraulic cylinders 104, 105 are thus arranged on different sides of a center line in the longitudinal direction of the vehicle for steering, or turning the wheel loader 101.

The wheel loader 101 comprises an apparatus 111 for handling objects or material. The apparatus 111 comprises a lifting arm unit 106 and an implement 107 in the form of a bucket which is mounted on the lifting arm unit. Here, the bucket 107 is filled with material 116. A first end of the lifting arm unit 106 is coupled rotatably to the front vehicle part 102 for bringing about a lifting movement of the bucket. The bucket 107 is coupled rotatably to a second end of the lifting arm unit 106 for bringing about a tilting movement of the bucket.

The lifting arm unit 106 can be raised and lowered in relation to the front part 102 of the vehicle by means of two hydraulic cylinders 108, 109, which are each coupled at one end to the front vehicle part 102 and at the other end to the lifting arm unit 106. The bucket 107 can be tilted in relation to the lifting arm unit 106 by means of a third hydraulic cylinder 110, which is coupled at one end to the front vehicle part 102 and at the other end to the bucket 107 via a link arm system.

Figure 2:
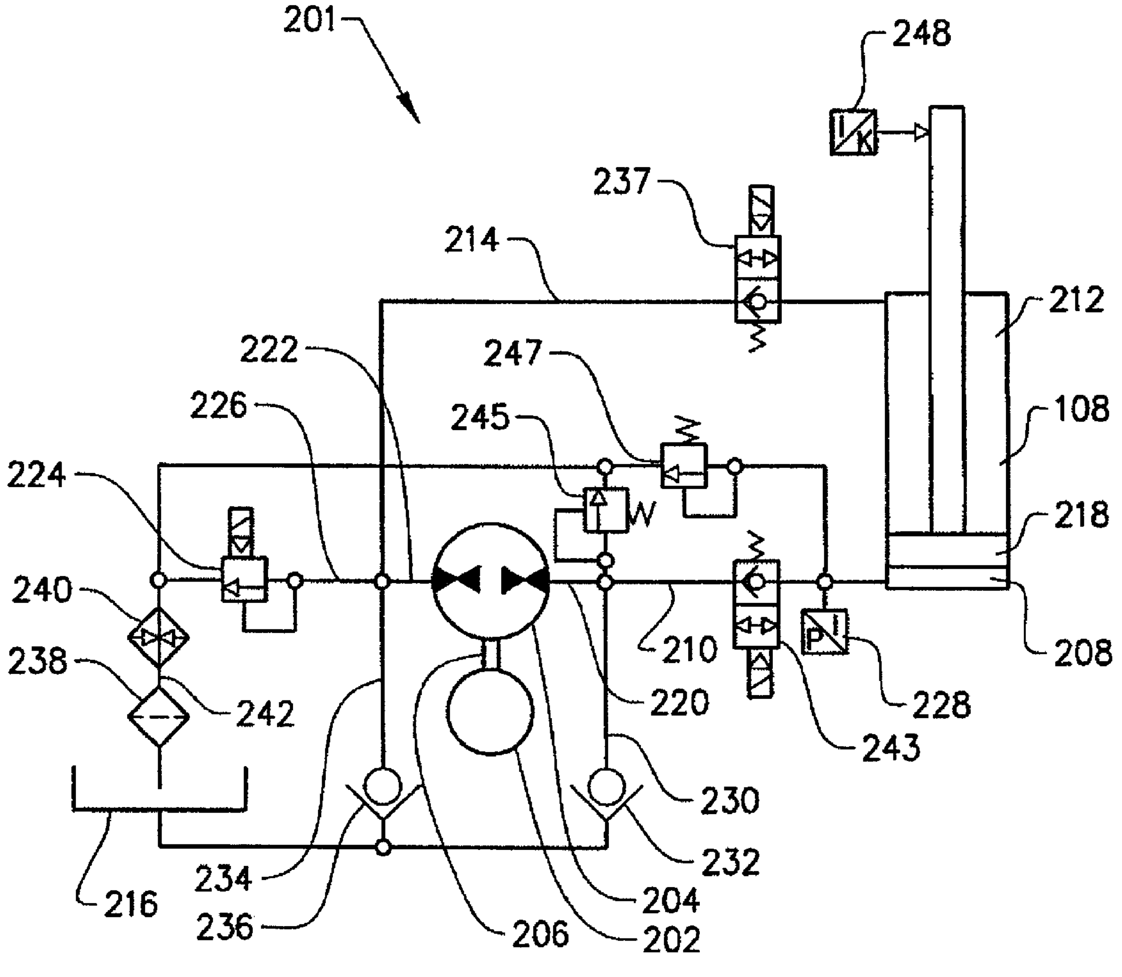
FIG. 2 shows an embodiment of a control system for controlling a work function of the wheel loader.

FIG. 2 shows a first embodiment of a control system 201 for performing lifting and lowering of the lifting arm 106, see FIG. 1. The hydraulic cylinder 108 in FIG. 2 therefore corresponds to the lifting cylinders 108, 109 (although only one cylinder is shown in FIG. 2). The embodiment of the control system should, however, also be able to be utilized for tilting the bucket 107 via the tilting cylinder 110.

The control system 201 comprises an electric machine 202, a hydraulic machine 204 and the lifting cylinder 108. The electric machine 202 is connected in a mechanically driving manner to the hydraulic machine 204 via an intermediate drive shaft 206. The hydraulic machine 204 is connected to a piston side 208 of the hydraulic cylinder 108 via a first line 210 and a piston-rod side 212 of the hydraulic cylinder 108 via a second line 214.

The hydraulic machine 204 is adapted to function as a pump, be driven by the electric machine 202 and supply the hydraulic cylinder 108 with pressurized hydraulic fluid from a tank 216 in a first operating state and to function as a motor, be driven by a hydraulic fluid flow from the hydraulic cylinder 108 and drive the electric machine 202 in a second operating state.

The hydraulic machine 204 is adapted to control the speed of the piston 218 of the hydraulic cylinder 108 in the first operating state. No control valves are therefore required between the hydraulic machine and the hydraulic cylinder for said control. More precisely, the control system 201 comprises a control unit 302, see FIG. 3, which is electrically connected to the electric machine 202 in order to control the speed of the piston of the hydraulic cylinder 108 in the first operating state by controlling the electric machine.

The hydraulic machine 204 has a first port 220 which is connected to the piston side 208 of the hydraulic cylinder via the first line 210 and a second port 222 which is connected to the piston-rod side 212 of the hydraulic cylinder via the second line 214. The second port 222 of the hydraulic machine 204 is moreover connected to the tank 216 in order to allow the hydraulic machine, in the first operating state, to draw oil from the tank 216 via the second port 222 and supply the oil to the hydraulic cylinder 108 via the first port 220.

The control system 201 comprises a means 224 for controlling pressure, which pressure means 224 is arranged on a line 226 between the second port 222 of the hydraulic machine 204 and the tank 216 in order to allow pressure build-up on the piston-rod side 212. More precisely, the pressure control means 224 comprises an electrically controlled pressure-limiting valve.

The control system 201 also comprises a sensor 228 for sensing pressure on the piston side 208 of the hydraulic cylinder 108.

The first port 220 of the hydraulic machine 204 is connected to the tank 216 via a first suction line 230. A means 232, in the form of a non-return valve, is adapted to allow suction of hydraulic fluid from the tank and obstruction of a hydraulic fluid flow to the tank through the suction line 230.

The second port 222 of the hydraulic machine 204 is connected to the tank 216 via a second suction line 234. A means 236, in the form of a non-return valve, is adapted to allow suction of hydraulic fluid from the tank and obstruction of a hydraulic fluid flow to the tank through the suction line 234.

A means 237 for opening/closing is arranged on the second line 214 between the second port 222 of the hydraulic machine 204 and the piston-rod end 212 of the hydraulic cylinder 108. This means 237 comprises an electrically controlled valve with two positions. In a first position, the line 214 is open for flow in both directions. In a second position, the valve has a nonreturn valve function and allows flow in only the direction toward the hydraulic cylinder 108. During lifting movement, the electric valve 237 is opened and the rotational speed of the electric machine 202 determines the speed of the piston 218 of the hydraulic cylinder 108. Hydraulic fluid is drawn from the tank 216 via the second suction line 234 and is pumped to the piston side 208 of the hydraulic cylinder 108 via the first line 210.

An additional line 242 connects the second port 222 of the hydraulic machine 204 and the tank 216.

A means 243 for opening/closing is arranged on the first line 210 between the first port 220 of the hydraulic machine 204 and the piston end 208 of the hydraulic cylinder 108. This means 243 comprises an electrically controlled valve with two positions. In a first position, the line 210 is open for flow in both directions. In a second position, the valve has a non-return valve function and allows flow in only the direction toward the hydraulic cylinder 108.

If the bucket 107 should stop suddenly during a lowering movement (which can happen if the bucket strikes the ground), the hydraulic machine 204 does not have time to stop. In this state, hydraulic fluid can be drawn from the tank 216 via the suction line 230 and on through the additional line 242.

The electrically controlled valves 237, 243 function as load-holding valves. They are closed in order that electricity is not consumed when there is a hanging load and also in order to prevent dropping when the drive source is switched off. According to an alternative, the valve 237 on the piston-rod side 212 is omitted. However, it is advantageous to retain the valve 237 because external forces can lift the lifting arm 106.

A filtering unit 238 and a heat exchanger 240 are arranged on the additional line 242 between the second port 222 of the hydraulic machine 204 and the tank 216. An additional filtering and heating flow can be obtained by virtue of the hydraulic machine 204 driving a circulation flow from the tank 216 first via the first suction line 230 and then via the additional line 242 when the lifting function is in a neutral position. Before the tank, the hydraulic fluid thus passes through the heat exchanger 240 and the filter unit 238.

There is another possibility for additional heating of the hydraulic fluid by pressurizing the electrically controlled pressure limiter 224 at the same time as pumping-round takes place to the tank in the way mentioned above. This can of course also take place when the lifting function is used.

In addition, the electrically controlled pressure limiter 224 can be used as a back-up valve for refilling the piston-rod side 212 when lowering is carried out. The back pressure can be varied as required and can be kept as low as possible, which saves energy. The hotter the oil, the lower the back pressure can be, and the slower the rate of lowering, the lower the back pressure can be. When there is a filtration flow, the back pressure can be zero.

A first pressure-limiting valve 245 is arranged on a line which connects the first port 220 of the hydraulic machine 204 to the tank 216. A second pressure-limiting valve 247 is arranged on a line which connects the piston side 208 of the hydraulic cylinder 108 to the tank 216. The two pressure-limiting valves 245, 247 are connected to the first line 210 between the hydraulic machine 204 and the piston side 208 of the hydraulic cylinder 108 on different sides of the valve 243. The two pressure-limiting valves 245, 247, which are also referred to as shock valves, are spring-loaded and adjusted to be opened at different pressures. According to an example, the first pressure-limiting valve 245 is adjusted to be opened at 270 bar, and the second pressure-limiting valve 247 is adjusted to be opened at 380 bar.

When the work machine 101 is driven toward a heap of gravel or stones and/or when the implement is lifted/lowered/tilted, the movement of the bucket may be counteracted by an obstacle. The pressure-limiting valves 245, 247 then ensure that the pressure is not built up to levels which are harmful for the system.

According to a first example, the bucket 107 is in a neutral position, that is to say stationary in relation to the frame of the front vehicle part 102. When the wheel loader 101 is driven toward a heap of stones, the second pressure limiter 247 is opened at a pressure of 380 bar.

During ongoing lowering, the valve 243 on the first line 210 between the hydraulic machine 204 and the piston side 208 of the hydraulic cylinder 108 is open. When the lifting arm 106 is lowered, the first pressure limiter 245 is opened at a pressure of 270 bar. If an external force should force the loading arm 106 upward during a lowering operation with power down, the pressure limiter 224 on the line 226 between the second port 222 of the hydraulic machine 204 and the tank 216 is opened.

According to an alternative to the pressure-limiting valves 245, 247 being adjusted to be opened at a predetermined pressure, the pressure-limiting valves can be designed with variable opening pressure. According to a variant, the pressure-limiting valves 245, 247 are electrically controlled. If electric control is used, only one valve 247 is sufficient for the shock function. This valve 247 is controlled depending on whether the valve 243 is open or closed. The opening pressure can be adjusted depending on activated or non-activated lifting/lowering function and also depending on the cylinder position.

A first embodiment of the control method comprises the steps of detecting an operating parameter and of generating a corresponding parameter signal, of determining a level of said pressure on the basis of the level of the detected operating parameter, of comparing the determined pressure level with a predetermined maximum level and of controlling the hydraulic machine in such a way that a supplied pressure is less than the predetermined maximum level. More specifically, the generated parameter signal is received by the control unit (the computer) and is processed, after which a control signal is sent to the electric machine that is connected in a driving manner to the hydraulic machine for reducing the supplied torque if the determined pressure level exceeds the predetermined maximum level.

The preferred embodiment comprises the steps of determining a torque out from the electric machine on the basis of a torque in to the electric machine and the displacement of the hydraulic machine, and of controlling the electric machine correspondingly. The electric machine is also preferably controlled in a way that corresponds to the efficiency of the hydraulic machine.

According to an alternative to detecting the torque of the electric machine, it is possible to detect the pressure of the hydraulic fluid in a line 210 associated with the hydraulic machine 204 and to compare the detected pressure level with the predetermined maximum level. For example, the pressure is detected by means of the pressure sensor 228.

According to yet another alternative, a parameter is detected that is indicative of the position of the implement 107, and the electric machine 202 is controlled correspondingly. For example, the position of the piston rod in the lifting cylinder is detected by means of a linear sensor or the angular position of the load arm is detected by means of an angle sensor. According to an alternative or in addition, the position of the implement is detected, for example by the position of the piston rod in the tilting cylinder or by means of an angle sensor. The position parameter is preferably detected repeatedly, suitably essentially continuously, and the electric machine is controlled correspondingly. The maximum pump pressure is thus varied, depending upon the position of the implement.

According to yet another alternative, the speed of the work machine, the current work being carried out by the work machine, the type of implement that is arranged on the work machine, and/or a mode selected by the driver is detected, and the electric machine is controlled correspondingly. By "work being carried out" is meant here an activity, such as handling/transportation of chippings, gravel, rubble, timber, pallets, snow-clearing, etc. By "type of implement" is meant here different implements, such as bucket, pallet forks, grab arms for timber, etc. The type of implement can, for example, be detected automatically or can be selected manually by the driver. The work being carried out can either be determined automatically during operation of the machine or can be selected manually by the driver. Consequently, by mode is meant either work being carried out or type of implement.

According to yet another alternative, a parameter is detected that is indicative of a different function than the function for which the hydraulic machine is arranged to supply a pressure, and the electric machine is controlled correspondingly. For example, a steering movement is detected (via the steering cylinders 104, 105) and the maximum pump pressure for the lift function (via the lifting cylinders 108, 109) is controlled.

A combination of a plurality of the abovementioned parameters is preferably used to determine how the electric machine is to be controlled.

According to a first example when controlling of the maximum pump pressure can be utilized, the load arm is in a position approximately halfway between its bottom position and top position and the bucket is maximally tilted downward. The geometry of the load arm and the bucket means that the bucket will make contact with the load arm in the event of further raising of the load arm. This can lead to great stresses. In such a situation, the maximum pressure of the pump can be limited, or alternatively the pump can be stopped completely. The driver must then tilt the bucket outward slightly, in order for further raising of the load arm to be carried out.

According to second example when controlling of the maximum pump pressure can be utilized, the machine is making a maximum steering movement (via the steering cylinders 104, 105) and lifting of a load commences. This position can be unstable, particularly with a heavy load. In such a situation, the maximum pressure of the pump can be limited, or alternatively the pump can be stopped completely. The driver must then reduce the steering movement in order for further raising of the load arm to be carried out.

According to a third example, the maximum pump pressure is controlled continuously during operation depending upon requirements. The pump's maximum available pressure is only required in certain situations, such as when breaking into a material from in front. In this situation, the load arm is arranged in a lowered position and the bucket is essentially level with the surface upon which the vehicle is being driven In this situation, the maximum pump pressure is thus not limited. For other work operations, however, it is possible to limit the pump pressure to various extents. The life of the system can thereby be increased.

Figure 3:
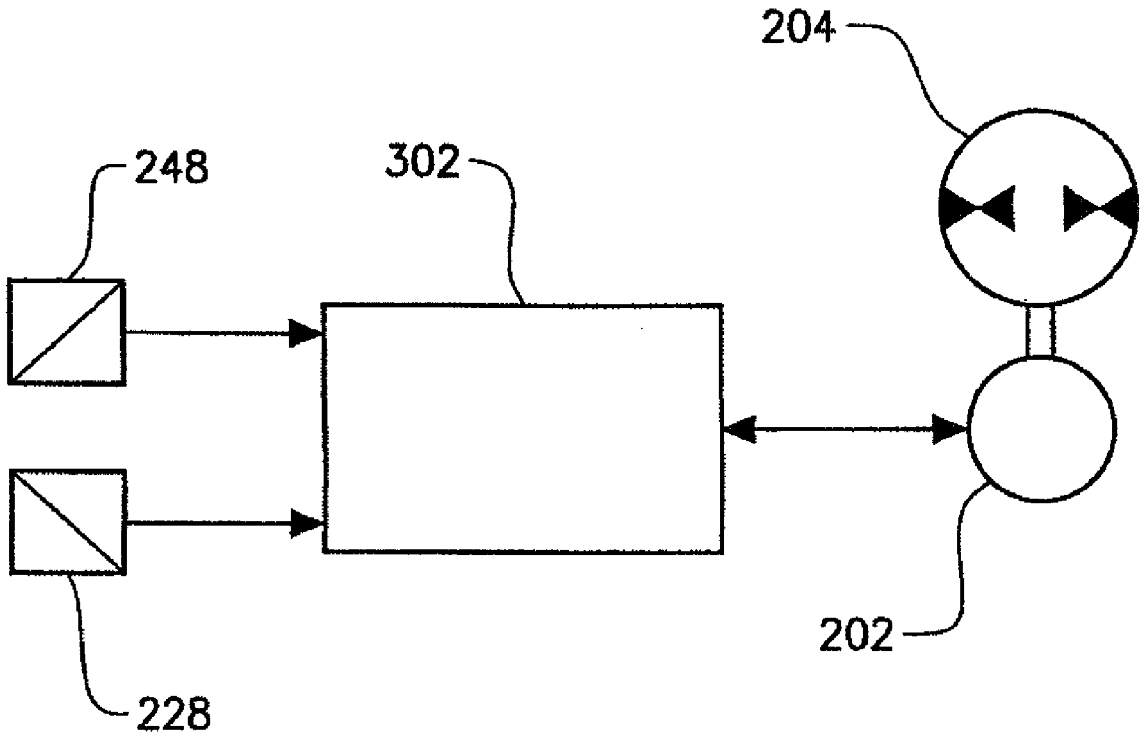
FIG. 3 shows schematically a control system for pressure-limiting of a hydraulic machine.

FIG. 3 shows a control system for the lowering function. The electric machine 202 is electrically connected to the control unit 302 in such a way that it is controlled by the control unit and can supply signals about operating conditions (such as torque) to the control unit 302. The control unit 302 is normally called a CPU (Central Processing Unit) and comprises a microprocessor and a memory. The memory preferably comprises information about the displacement of the hydraulic machine. The position sensor 248 and the pressure sensor 228 are also connected to the control unit 302.

The invention is not to be regarded as being limited to the illustrative embodiments described above, but a number of further variants and modifications are conceivable within the scope of the following patent claims.

The invention claimed is:

1. A method for controlling a hydraulic machine in a control system when utilizing the hydraulic machine as a pump, in which an electric machine is connected in a driving manner to the hydraulic machine, comprising detecting at least one operating parameter, determining, based on the detected operating parameter, an allowed maximum pressure and whether a pressure supplied by the hydraulic machine is to be limited, and controlling the electric machine to limit the pressure supplied by the hydraulic machine by controlling torque out from the electric machine and displacement of the hydraulic machine, wherein torque out from the electric machine is determined based on torque in to the electric machine.

2. The method as claimed in claim 1, comprising also controlling the electric machine in a way that corresponds to an efficiency of the hydraulic machine.

3. The method as claimed in claim 1, comprising utilizing various predetermined values of the torque into the electric machine.

4. The method as claimed in claim 1, wherein the hydraulic machine supplies a hydraulic actuator with pressurized hydraulic fluid.

5. A work machine for controlling an implement comprising a hydraulic machine in a control system, the hydraulic machine being adapted to be used as a pump, and an electric machine connected in a driving manner to the hydraulic machine, and means for detecting at least one operating parameter, wherein the control system is arranged to determine, based on the detected operating parameter, an allowed maximum pressure and whether a pressure supplied by the hydraulic machine is to be limited, and to control the electric machine to control the pressure supplied by the hydraulic machine by controlling torque out from the electric machine and displacement of the hydraulic machine, wherein torque out from the electric machine is determined based on torque in to the electric machine.

6. The work machine as claimed in claim 5, wherein the at least one operating parameter comprises a parameter that is indicative of the position of the implement.

7. The work machine as claimed in claim 5, wherein the at least one operating parameter comprises a parameter that is indicative of a different function than a function for which the hydraulic machine is arranged to supply a pressure.

8. The work machine as claimed in claim 5, wherein the at least one operating parameter comprises a speed of the work machine.

9. The work machine as claimed in claim 5, comprising controlling the electric machine corresponding to work currently being carried out by the work machine.

10. The work machine as claimed in claim 5, comprising controlling the electric machine corresponding to a type of implement that is arranged on the work machine.

11. The work machine as claimed in claim 5, wherein the at least one operating parameter comprises a mode selected by a driver.

* * * * *